Figure 1:
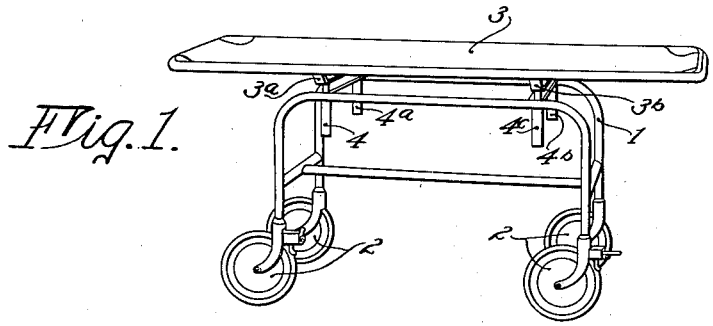

June 3, 1941.     E. R. SCUDDER     2,244,122

WHEEL STRETCHER WITH SPRING SUSPENDED LITTER

Filed April 6, 1940

INVENTOR
ELIOT R. SCUDDER
BY Chapin + Neal
ATTORNEYS

Patented June 3, 1941

2,244,122

UNITED STATES PATENT OFFICE 2,244,122

WHEEL STRETCHER WITH SPRING SUSPENDED LITTER

Eliot R. Scudder, Braintree, Mass., assignor to Jarvis & Jarvis, Inc., Palmer, Mass., a corporation of Massachusetts Application April 6, 1940, Serial No. 328,245

2 Claims. (Cl. 296—20)

This invention relates to an improvement in wheel stretchers commonly used in hospitals, and has for its object the provision of a spring suspended litter mounted on the same. In accordance with the invention, the entire weight of a patient being carried on the litter is supported on soft cushioning springs which will absorb the shocks caused by rolling on and off elevators or by floor obstructions. A further object is to provide spring suspension means for the litter which will prevent any possible side-sway of the same in carrying the patient and which will be of strong, durable, and economical construction, adding but small cost to wheel stretchers as heretofore made.

In the preferred embodiment of the invention as shown in the drawing—

Figure 2:
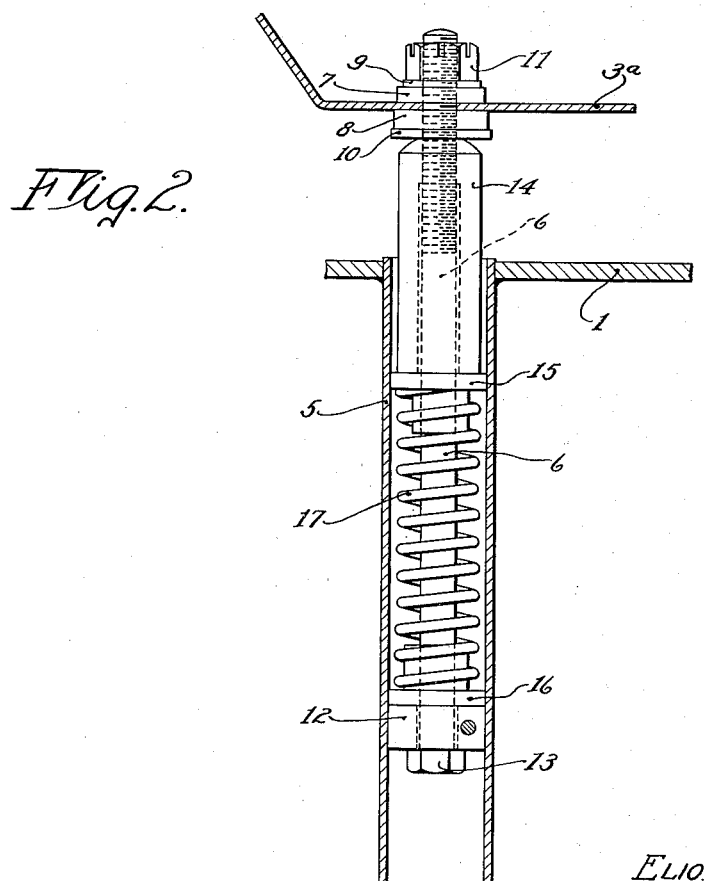

Fig. 1 is a view in perspective of the wheel stretcher and its spring supported litter; and Fig. 2 is a sectional view (somewhat enlarged as compared with Fig. 1) through one of the points of suspension of said litter as at 2—2, Fig. 1, to show the details of construction of the same.

Referring more particularly to the drawing, the complete apparatus comprises a stretcher or frame member 1 supported in the usual manner upon caster wheels 2 and having mounted thereon a litter member of usual construction as indicated at 3.

The litter 3 has fastened thereto underlying straps or brackets 3a and 3b for being supported on the frame 1 by four-point suspension means which provide at each point of suspension a spring cushion support shown in more detail in Fig. 2 of the drawing. For each point of suspension there is a cylinder 5 securely fastened as by welding or the like to a bar of the stretcher frame 1 and depending therefrom as shown. A plunger rod 6 is detachably fastened to the strap 3a or 3b of litter 3 as by means of rubber washers 7 and 8, metal washers 9 and 10, and the castellated lock nut 11, the latter being threaded on the upper end of said rod 6.

At a lower part of the cylinder 5 there is fixed a stop collar 12 made fast in any suitable way to the inside wall of said cylinder 5 and having a central orifice somewhat larger than rod 6 and through which said plunger rod extends freely and loosely for a reciprocable movement therethrough. The lower end of the rod 6 has fixed thereto a hexagonal head 13 which limits the upper extent of said reciprocable movement. There is mounted upon said rod 6 near the upper end thereof and preferably by being screw threaded thereon a plunger 14 which extends downwardly from the upper end of the rod 6 and partially into the cylinder 5. At the lower end of said plunger 14 is a guide bushing 15 and at the upper side of the stop collar 12 there is a guide bushing 16 and interposed between said bushings 15 and 16 is a helically coiled spring 17. The tension of said spring 17 may be adjusted, viz. compressed, or relaxed, by turning the screw threaded plunger 14 on the rod 6.

The guide bushings 15 and 16 are each proportioned and fitted within the cylinder 5 and around the rod 6 to serve as bearing guides for the reciprocations of said plunger rod 6, bushing 15 acting as the upper guide with its periphery working on the inner wall of cylinder 5 and bushing 16 acting as the lower guide with its central orifice serving as the bearing for the sliding rod 6. In order that these bearings may be at all times noiseless and properly lubricated the aforesaid bushings 15 and 16 are made of suitable composition of a self-lubricated character such as for example hard rubber impregnated with graphite.

It will be understood that at each point of suspension for the litter 3 such as 4, 4a, 4b, and 4c, as shown in Fig. 1, there is provided a spring suspension means such as shown in Fig. 2 whereby the litter 3 is supported on said cushion springs for the carriage of a patient with maximum of comfort during the travel of the wheel stretcher about the hospital. The plungers 14 extend far enough within the cylinders 5 so as to retain the springs 17 completely within the cylinders 5 during all reciprocable movements of said plunger rods 6, which construction minimizes the possibility of clothing or other wrapping becoming caught or entangled in the movable plunger suspension means. Inasmuch as the cushioning movement at each point of suspension for the litter is limited to a vertical reciprocation, all possibility of side-sway is eliminated as a result of which there is a minimum of disturbance of the position of the patient on the litter during transportation.

What I claim is:

1. In a spring supported litter in combination, a wheel supported frame member and a litter member adapted to be mounted thereon, four-point suspension means between said frame member and litter member comprising at each point of suspension a cylinder secured to one of said members and a plunger rod secured to the other of said members, said plunger rod being mounted for reciprocable movement in said cylinder, a stop collar fastened in the lower part of said cylinder, a plunger fastened on the upper part of said rod, and a helically coiled spring interposed between said plunger and said collar, said plunger being in the form of a tubular member screw threaded on said rod for adjusting the tension of said spring and extended far enough down on said rod to retain said spring completely in said cylinder during all reciprocable movements of said plunger rod.

2. In a spring supported litter in combination, a wheel supported frame member and a litter member adapted to be mounted thereon, four-point suspension means between said frame member and litter member comprising at each point of suspension a cylinder secured to one of said members and a plunger rod secured to the other of said members, said plunger rod being mounted for reciprocable movement in said cylinder, a stop collar fastened in the lower part of said cylinder, a plunger fastened on the upper part of said rod, a pair of spaced apart bushings fitting on said rod and within said cylinder to serve as guide bearings for said rod, one of said bushings being mounted at the lower end of said plunger, the other bushing being mounted at the upper side of said stop collar, and a helically coiled spring interposed between said bushings, said plunger being in the form of a tubular member screw threaded on said rod for adjusting the tension of said spring and extended far enough down on said rod to retain said spring completely in said cylinder during all reciprocable movements of said plunger rod.

ELIOT R. SCUDDER.